(12) United States Patent
Hanano et al.

(10) Patent No.: US 12,722,591 B2
(45) Date of Patent: Sep. 1, 2026

(54) SEALING STRUCTURE OF SEALED CONTAINER, FORMATION METHOD THEREFOR, GAS GENERATOR USING SEALING STRUCTURE OF SEALED CONTAINER, AND MANUFACTURING METHOD THEREFOR

(71) Applicant: DAICEL CORPORATION, Osaka (JP)

(72) Inventors: Teppei Hanano, Tatsuno (JP); Shuichi Shonai, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 1058 days.

(21) Appl. No.: 17/885,379

(22) Filed: Aug. 10, 2022

(65) Prior Publication Data

US 2022/0379836 A1 Dec. 1, 2022

Related U.S. Application Data

(63) Continuation of application No. 16/613,024, filed as application No. PCT/JP2018/021687 on Jun. 6, 2018, now Pat. No. 11,554,747.

(30) Foreign Application Priority Data

Jun. 29, 2017 (JP) ................................ 2017-126913

(51) Int. Cl.
*B60R 21/264* (2006.01)
*B23K 15/00* (2006.01)
(Continued)

(52) U.S. Cl.
CPC ........ *B60R 21/264* (2013.01); *B23K 15/0046* (2013.01); *B23K 26/32* (2013.01);
(Continued)

(58) Field of Classification Search
None
See application file for complete search history.

(56) References Cited

U.S. PATENT DOCUMENTS 4,056,876 A * 11/1977 Lammermann ........ B01D 27/07 156/196
4,711,179 A 12/1987 Sundberg et al.
(Continued)

FOREIGN PATENT DOCUMENTS

CN 102883922 A 1/2013
CN 103732111 A 4/2014
(Continued)

OTHER PUBLICATIONS

Chinese Office Action and Search Report for Chinese Application No. 201880041059.1, dated Sep. 18, 2021.
(Continued)

*Primary Examiner* — Elizabeth M Kerr
(74) *Attorney, Agent, or Firm* — Birch, Stewart, Kolasch & Birch, LLP

(57) ABSTRACT

A sealing structure of a sealed container includes, a metallic cylindrical container having an opening, and a metallic closing member that closes the opening. The metallic closing member has an outer surface opposing an inner wall surface of the metallic cylindrical container, and the outer surface of the metallic closing member is one of plated with metal and covered with thermoplastic resin. The metallic closing member seals the opening of the metallic cylindrical container by one of melted metal and melted thermoplastic resin, and the one of melted metal and melted thermoplastic resin is a material different from a material of the metallic cylindrical container and the metallic closing member.

5 Claims, 9 Drawing Sheets

(51) Int. Cl.

| | |
|---|---|
| ***B23K 26/32*** | (2014.01) |
| ***B29C 65/16*** | (2006.01) |
| ***F42B 3/103*** | (2006.01) |
| *B60R 21/26* | (2011.01) |

(52) U.S. Cl.
CPC .............. *B29C 65/16* (2013.01); *F42B 3/103* (2013.01); *B60R 2021/26029* (2013.01); *B60R 2021/26082* (2013.01)

(56) References Cited

U.S. PATENT DOCUMENTS

| | | | | |
|---|---|---|---|---|
| 6,547,275 | B2 | 4/2003 | Nakashima et al. | |
| 8,556,294 | B1 | 10/2013 | Norman, III | |
| 8,702,125 | B1 | 4/2014 | Smith et al. | |
| 9,353,703 | B2 | 5/2016 | Kobayashi | |
| 10,179,317 | B2 | 1/2019 | Noda et al. | |
| 2005/0263993 | A1 | 12/2005 | Blackburn | |
| 2007/0001439 | A1 | 1/2007 | Matsuda et al. | |
| 2009/0001141 | A1* | 1/2009 | Spriestersbach ... | B23K 35/0227 228/56.3 |
| 2010/0201111 | A1 | 8/2010 | Yamazaki et al. | |
| 2011/0248486 | A1 | 10/2011 | Numoto | |
| 2011/0254254 | A1 | 10/2011 | Numoto | |
| 2013/0276660 | A1 | 10/2013 | Ukita et al. | |
| 2014/0123868 | A1 | 5/2014 | Kobayashi | |
| 2014/0178613 | A1 | 6/2014 | Koshiyama et al. | |
| 2017/0050609 | A1 | 2/2017 | Yamashita et al. | |
| 2017/0210333 | A1* | 7/2017 | Imai ...................... | B60R 21/262 |
| 2021/0129788 | A1 | 5/2021 | Hagihara et al. | |

FOREIGN PATENT DOCUMENTS

| | | | |
|---|---|---|---|
| DE | 25 47 904 | A1 | 4/1977 |
| DE | 11 2005 001 301 | T5 | 4/2007 |
| DE | 10 2008 036 238 | A1 | 4/2010 |
| DE | 11 2017 006 582 | T5 | 9/2019 |
| GB | 2 278 908 | A | 12/1994 |
| JP | 62-501441 | A | 6/1987 |
| JP | 3-280493 | A | 11/1991 |
| JP | 2005-112003 | A | 4/2005 |
| JP | 2006-347374 | A | 12/2006 |
| JP | 3134281 | U | 8/2007 |
| JP | 2006-240279 | A | 9/2008 |
| JP | 2010-184559 | A | 8/2010 |
| JP | 2011-225069 | A | 11/2011 |
| JP | 2013-63780 | A | 4/2013 |
| JP | 2014-94614 | A | 5/2014 |
| JP | 2015-9598 | A | 1/2015 |
| WO | WO 00/48868 | A1 | 8/2000 |
| WO | WO 00/50273 | A1 | 8/2000 |
| WO | WO 2013/146153 | A1 | 10/2013 |
| WO | WO 2016/170968 | A1 | 10/2016 |
| WO | WO 2017/183626 | A1 | 10/2017 |
| WO | WO 2020/149399 | A1 | 7/2020 |

OTHER PUBLICATIONS

International Preliminary Report on Patentability and English translation of the Written Opinion of the International Searching Authority for International Application No. PCT/JP2018/021687, dated Jan. 9, 2020.

International Search Report for International Application No. PCT/JP2018/021687, dated Aug. 21, 2018.

* cited by examiner

SEALING STRUCTURE OF SEALED CONTAINER, FORMATION METHOD THEREFOR, GAS GENERATOR USING SEALING STRUCTURE OF SEALED CONTAINER, AND MANUFACTURING METHOD THEREFOR

CROSS REFERENCE TO RELATED APPLICATIONS

This application is a Continuation of co-pending U.S. patent application Ser. No. 16/613,024, filed on Nov. 12, 2019, which is a National Phase of PCT International Application No. PCT/JP2018/021687, filed on Jun. 6, 2018, which claims the benefit of Patent Application No. JP 2017-126913 filed in Japan, on Jun. 29, 2017. The entire contents of which are hereby incorporated by reference.

TECHNICAL FIELD

The present invention relates to a sealing structure of a sealed container, a gas generator using the sealing structure, a formation method for the sealing structure of the sealed container, and a manufacturing method for the gas generator using the sealing structure.

BACKGROUND ART

In various technical fields, there may be a need for a container that requires air tightness for preventing moisture from outside. For example, in a case of a gas generator used for an airbag device mounted in a vehicle, the gas generator is configured to prevent moisture from entering from outside, after placing necessary components from an opening of a container (housing), and thereafter, closing the opening using an igniter having a closing member or an igniter collar, an O-ring, and the like.

An igniter assembly is disclosed in JP 3134281 U, with a structure in which an inside of an igniter collar, an annular projection part of the igniter collar, and a cylindrical projection part that is a portion of the annular projection part are covered with a resin to improve moisture prevention.

JP 2010-184559 A discloses, in FIG. 1, a gas generator 1 including a cylindrical housing 10. An igniter 16 is disposed on one end side of the cylindrical housing 10, and the igniter 16 is fixed by a metallic igniter collar 17 and a resin 18. Furthermore, as disclosed in FIG. 1, one end side of the cylindrical housing 10 is crimped radially inward, and thus, the metallic igniter collar 17 and the cylindrical housing 10 are brought into close contact with each other, and moreover the O-ring is also disposed to increase the air tightness.

U.S. Pat. No. 8,702,125 B discloses, in FIG. 1, an inflator 14 including a cylindrical housing 12. An igniter 32 is disposed on one end side of the cylindrical housing 12, and a cylindrical member is disposed between the igniter 32 including an igniter collar and the cylindrical housing 12, this cylindrical member having a small thickness and including an end 24 that is closed and another end that is opened on an opposite side thereto.

SUMMARY OF INVENTION

A first aspect of the present invention (hereinafter referred to as a "first aspect") provides a sealing structure of a sealed container in which an opening of a metallic cylindrical container is closed with a metallic closing member, wherein

- a gap between an inner wall surface on an side of the opening of the metallic cylindrical container and an outer surface of the metallic closing member that radially faces the inner wall surface is sealed with a seal member having been melted and solidified.

A second aspect of the present invention (hereinafter referred to as a "second aspect") provides a sealing structure of a sealed container in which a cylindrical opening of a metallic container is closed with a metallic closing member, wherein

- a gap between an inner wall surface on a side of the cylindrical opening of the metallic container and an outer surface of the metallic closing member that radially faces the inner wall surface is sealed with a seal member having been melted and solidified.

The present invention provides

- a gas generator in which a gas source is filled in a housing having a gas discharge port, and a component including an igniter actuated by an ignition current is housed in an opening of the housing, or
- a gas generator in which a gas generating agent as a gas generating source and a component including an igniter for igniting and combusting the gas generating agent is housed in a housing having a gas discharge port, wherein
- the sealing structure of the sealed container according to the first aspect or the second aspect is used in an opening, to which the igniter having at least an igniter collar is fixed, of the housing.

The present invention further provides a method for forming the sealing structure described above, and a method for manufacturing the gas generator including the sealing structure described above.

BRIEF DESCRIPTION OF DRAWINGS

The present invention will be more fully understood from the detailed description given hereinbelow and the accompanying drawings, which are given for explanation only and do not limit the present invention.

DESCRIPTION OF EMBODIMENTS

Figure 1:
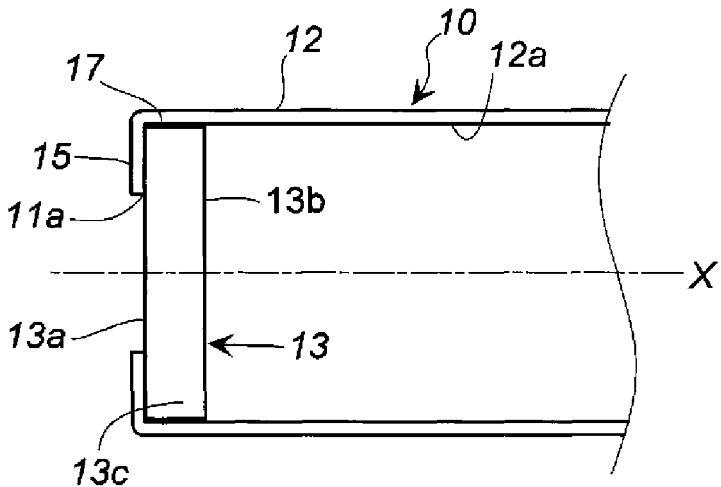
FIG. 1 illustrates a partial cross-sectional view of a sealed container including a sealing structure in an axis X direction according to an embodiment of the present invention.

In FIG. 1 of U.S. Pat. No. 8,702,125 B, the cylindrical housing 12 includes a portion radially facing the ignition collar of the igniter 32, with this portion being crimped inward to make both the cylindrical housing 12 and the cylindrical member having a small thickness abut against the igniter collar, whereby, it is considered that both air tightness and pressure resistance are enhanced.

An embodiment of the present invention provides a sealed container having a specific sealing structure excellent in moisture prevention, a gas generator using the sealing container, a method for forming the sealing structure of the sealed container, and a method for manufacturing the gas generator using the sealed container.

A first aspect includes a sealing structure in which an opening of a metallic cylindrical container is closed with a metallic closing member. In the sealing structure, a gap between an inner wall surface on an side of the opening of the metallic cylindrical container and an outer surface of the metallic closing member that radially faces the inner wall surface is closed and sealed with a seal member having been melted and solidified.

The gap being closed and sealed with the melted and solidified seal member refers to a state in which the seal member in a melted state seals the gap and thereafter by being fused to both the inner wall surface on the side of the opening of the metallic cylindrical container and the outer surface of the metallic closing member radially facing the inner wall surface, and thereafter, the seal member is solidified.

A cross-sectional shape of the metallic cylindrical container in a width direction thereof is not particularly limited, and may be circular, elliptical, polygonal, or the like.

The metal of the metallic cylindrical container and the metal of the metallic closing member may be the same or different from each other, but are preferably the same.

The metallic closing member may have a first surface, a second surface on a side opposite the first surface in a thickness direction, and a circumferential surface part between the first surface and the second surface, and may have a shape the same as that of the opening and a size enough to insert into the opening.

For example, the metallic closing member to be used may be, depending on a state of an opening to be closed, a plate-like member, a lump-like member thicker than the plate-like member, or a lump-like or thick plate-like member having a portion protruding from a part thereof outward in the axis direction. In addition, the metallic closing member to be used may be a lump-like or thick plate-like member having a plate-like part (an annular protruding part) protruding radially outward from a part thereof.

The seal member to be used may be a member that is be solidified after being melted, and selected from metal and thermoplastic resin.

In a case where a member constituting the seal member is metal, the metal to be used preferably has a low melting point, which is lower than that of metal constituting the metallic cylindrical container and that of metal constituting the metallic closing member.

In a case where the member constituting the seal member is thermoplastic resin, the thermoplastic resin preferably has low hygroscopicity, and preferably includes polyester resins, such as polyethylene terephthalate and polybutylene terephthalate, and polyolefin resins, such as polypropylene, and the like.

Unlike the case where metal is simply clamped, as described, for instance, in U.S. Pat. No. 8,702,125 B, in the sealing structure of a first embodiment, the melted seal member diffuses into the corner of the gap as described above, and the air tightness is further enhanced.

In a preferred embodiment of the sealing structure of the first aspect, one or both of the inner wall surface on a side of the opening of the metallic cylindrical container and the outer surface of the metallic closing member has a rough surface. When one or both of the surfaces has a rough surface, that is, a surface having unevenness as described above, the melted seal member easily adheres and sealing performance is enhanced, which is preferable. A roughening method is not particularly limited, hence a method of rasping or the like, a method of cutting by cutting processing, sand blasting, irradiation with laser light, and the like can be adopted.

In a preferred embodiment of the sealing structure of the first aspect, the seal member is metal or resin, for example, thermoplastic resin, and a melting point in a case where the seal member is metal is, at least, 100° C. lower than the lower of a melting point of metal constituting the metallic cylindrical container and a melting point of metal constituting the metallic closing member. Preferably, the melting point of the metal constituting the seal member is from 200° C. to 300° C. lower than the melting point of the metal constituting the cylindrical container or that of the metal constituting the closing member. When temperature conditions of the melting points are satisfied, the metallic cylindrical container and the metallic closing member receive no thermal impact, and this is preferable.

A sealing structure of a second aspect differs from the sealing structure of the first aspect only in the shape and structure of the container, and the sealing structures themselves and effects thereof are the same.

The sealing structure of the second aspect is formed in a cylindrical opening of the metallic container. One or a plurality of cylindrical openings may be provided depending on the application.

The cylindrical opening may have a shape protruding outward from a container body, or may have a shape formed in a recess formed inside the container without protruding outward from the container body. The cylindrical opening may be directly connected to the container body, or may be connected to the container body via another member.

In a preferred embodiment of the sealing structure of the second aspect, one or both of the inner wall surface on a side of the cylindrical opening of the metallic container and the outer surface of the metallic closing member has a rough surface. When one or both of the surfaces has a rough surface, that is, a surface having unevenness as described above, the melted seal member easily adheres and sealing performance is enhanced, which is preferable.

In a preferred embodiment of the sealing structure of the second aspect, the seal member is metal or resin, for example, thermoplastic resin, and a melting point when the seal member is metal is, at least, 100° C. lower than the lower of a melting point of metal constituting the metallic container and a melting point of metal constituting the metallic closing member. Preferably, the melting point of the metal constituting the seal member is from 200° C. to 300° C. lower than the melting point of the metal constituting the cylindrical container or that of the metal constituting the closing member. When the temperature conditions of the melting points are satisfied, the metallic container and the metallic closing member receive no thermal impact, and this is preferable.

The gas generator according to an embodiment of the present invention can be applicable to a pyro-type gas generator using only a gas generating agent as a gas generating source, or a hybrid inflator using a gas generating agent, argon, helium, and the like as a gas generating source.

Depending on a form of the gas generator, the housing may be cylindrically shaped or disk-shaped. A disk-shaped housing has a length (L) shorter than the cylindrical housing and a diameter (D) larger than the cylindrical housing (i.e., the disk-shaped housing has L/D smaller than that of the cylindrical housing).

When the gas generator uses a cylindrical housing, the sealing structure of the first aspect, in which a gas discharge port is formed, may be used as the cylindrical housing. In this configuration, the sealing structure of the first aspect can be used on one end or both ends.

For instance, examples of this configuration include a gas generator having an opening on one end side that is closed with an igniter including a metallic collar (a closing member) fixed thereto, an opening on the other end side that is closed by a plate-like closing member, and having a plurality of gas discharge ports that are provided to the peripheral wall part.

On the opening on one end side, a gap between an outer surface of the metallic collar and an inner wall surface of the cylindrical housing is sealed with a seal member that is solidified after fusing.

On the opening on the other end side, a gap between a circumferential surface of the plate-like closing member and the inner wall surface of the cylindrical housing is sealed with the melted and solidified seal member, thereby forming the sealing structure of the first aspect.

When the gas generator uses a disk-shaped housing, the sealing structure of the second aspect, in which a gas discharge port is formed, may be used as the disk-shaped housing.

For example, in a housing including a top plate, a bottom plate on a side opposite the top plate in the axial direction, and a peripheral wall part including a gas discharge port between the top plate and the bottom plate, a gas generator in which a cylindrical opening of the bottom plate is closed by an igniter including a metallic collar (a closing member) may be used.

In the cylindrical opening, a gap between the outer surface of the metallic collar and an inner wall surface of the cylindrical opening is sealed with the melted and solidified seal member, thereby forming the sealing structure of the second aspect.

An embodiment of the present invention provides a method for forming the sealing structure of the sealed container of the first aspect, including,

- inserting the closing member into the opening of the cylindrical container, with the seal member being interposed between the closing member and the cylindrical container (first step),
- crimping a peripheral wall part on the side of the opening of the cylindrical container to fix the closing member (second step), and
- heating the cylindrical container from outside to melt the seal member, thereby fusing the seal member to both the inner wall surface on the side of the opening of the metallic cylindrical container and the outer surface of the metallic closing member, and thereafter, solidifying the seal member (third step).

Insertion of the closing member in the first step is performed at an insertion position that is slightly inward from the opening, taking into account a length of the crimped portion in the second step. A protrusion, a step, or the like may be formed on the inner wall surface of the cylindrical container to determine the insertion position of the closing member. Depending on the way the crimping method is implemented, the insertion position may also be determined by press-fitting the closing member into the opening of the cylindrical container.

Examples of the crimping method in the second step include a rolling crimping method.

Examples of the heating method in the third step include heating by laser beam welding and heating by electron beam welding, and in addition, heating by a gas burner or the like, and heating by placement in a heating apparatus. Preferably, a portion where the seal member is disposed may be locally heated, and in a case of using the laser beam welding or electron beam welding, the electron beam may have a strength that melts merely the seal member even when the beam is irradiated from outside the cylindrical member, and a welding beam does not need to advance deeply down to the closing member (i.e., the beam does not necessarily reach the closing member). Because of this, an amount of heat generated for welding is limited, and a thermal impact on the closing member becomes smaller, and for example, when resin is present in the vicinity of the closing member, thermal deformation thereof can be suppressed.

An embodiment of the present invention provides a method for forming the sealing structure of the sealed container of the second aspect, including,

- inserting the closing member into the cylindrical opening of the metallic container, with the seal member being interposed between the closing member and the metallic container;
- crimping a peripheral wall part on the side of the cylindrical opening of the metallic container to fix the closing member; and
- heating the cylindrical opening of the metallic container from outside to melt the seal member, thereby fusing the seal member to both the inner wall surface on the side of the cylindrical opening of the metallic container and the outer surface of the metallic closing member, and thereafter, solidifying the seal member.

The method for forming the sealing structure of the sealed container of the second aspect differs from the method for forming the sealing structure of the sealed container of the first aspect in a position, where the closing member is attached, because the container shapes in these methods are different from each other, but the methods can be performed based on the same process.

A preferred embodiment of the method for forming the sealing structure of the present invention is to use the closing member having the outer surface covered with the seal member.

The closing member having the outer surface covered with the seal member may be, for example, a closing member having an outer surface plated with metal, such as copper, and a closing member having an outer surface covered with thermoplastic resin. When such a closing member is used, the seal member is easily interposed, and this is preferable.

An embodiment of the present invention provides a method for manufacturing a gas generator including the sealing structure of the sealed container of the first aspect, including, housing and arranging a gas source and another component, as necessary, in the cylindrical container having a gas discharge port formed in advance;

inserting an igniter including a metallic igniter collar provided with a part serving as the closing member from a first end opening of the cylindrical container, with the seal member being interposed between the igniter and the cylindrical container;

crimping a peripheral wall part on a side of the first end opening of the cylindrical container to fix the igniter collar; and heating the metallic cylindrical container on the side of the first end opening from outside to melt the seal member, thereby fusing the seal member to both the inner wall surface on the first end opening side of the metallic container and the outer surface of the igniter collar, and thereafter, solidifying the seal member.

An embodiment of the present invention provides a method for manufacturing a gas generator including the sealing structure of the sealed container of the first aspect, including, inserting the plate-like closing member into a second end opening of the metallic cylindrical container having a gas discharge port formed in advance, with the seal member being interposed between the metallic cylindrical container and the plate-like closing member (first step);

crimping a peripheral wall part on a side of the second end opening of the cylindrical container to fix the plate-like closing member (second step);

housing and arranging a gas generating agent and another component from a first end opening of the cylindrical container (third step);

inserting an igniter including a metal igniter collar provided with a part serving as the closing member from the first end opening of the cylindrical container, with the seal member being interposed between the igniter and the cylindrical container (fourth step);

crimping a peripheral wall part on the side of the first end opening of the cylindrical container to fix the igniter collar (fifth step); and heating the metallic cylindrical container on the side of the first end opening and the side of the second end opening from outside to melt the seal member, thereby fusing the seal member to both the inner wall surface on the side of the first end opening of the metallic container and the outer surface of the igniter collar and fusing the seal member to both the inner wall surface on the side of the second end opening of the metallic container and the outer surface of the metallic closing member, and thereafter, solidifying the seal member (sixth step).

Insertion of the closing member in the first step is implemented at an insertion position slightly inward from the opening, taking into account a length of the deformed portion in the second step.

Examples of the crimping method in the second step include a rolling crimping method.

Examples of another component arranged as needed in the third step include a filter and a retainer.

Insertion of the igniter having the metal igniter collar having a portion serving as the closing member in the fourth step is implemented at an insertion position slightly inward from the opening, taking into account a length of the crimped portion in the fifth step.

In the first step and the fourth step, a protrusion, a step, or the like may be formed on the inner wall surface of the cylindrical container to determine the insertion position of the igniter. Depending on the way the crimping method is implemented, the insertion position is also determined by press-fitting the closing member into the opening of the cylindrical container.

The crimping method in the fifth step is performed in the same manner as in the third step.

The heating in the sixth step may be a method in which the seal member can be heated and melted without damaging the cylindrical housing, the closing member, and the igniter collar.

Examples of the heating method include heating by laser beam welding and heating by electron beam welding, and in addition, heating by a gas burner or the like, and heating by placement in a heating apparatus. Preferably, in a case where a portion, where the seal member is disposed, is locally heated and using the laser beam welding or electron beam welding, the beam may have a strength at which, for instance, the seal member melts even when the beam is irradiated from the outside of the cylindrical member, and a welding beam does not need to advance deeply down to the closing member (i.e., the beam does not necessarily reach the closing member). Because of this, an amount of heat generated for welding is limited, and a thermal impact on the closing member becomes smaller, and for example, when resin is present in the vicinity of the closing member, thermal deformation thereof can be suppressed.

Note that the cylindrical housing used in the first step may be a housing having a gas discharge port formed, in advance, on the peripheral wall part, a housing having an opening, to which a component having a gas discharge port (a cup-shaped diffuser portion) is fixed by welding or the like, on any one of the ends of the cylindrical housing, or a housing having an opening, which is closed, on any one of the ends. The cup-shaped diffuser portion includes a gas discharge port formed in one or both of a peripheral wall part and a bottom face part of a metal cup.

In the first step, in a case of using the housing having the second end opening to which the cup-shaped diffuser portion is fixed, the first step and the second step are omitted.

An embodiment of the present invention provides a method for manufacturing a gas generator including the sealing structure of the sealed container of the second aspect, including, housing and arranging a gas source such as a gas generating agent, an igniter, and another component, in the metallic container having a gas discharge port formed in advance;

inserting the closing member into the cylindrical opening of the metallic container, with the seal member being interposed between the closing member and the metallic container, crimping a peripheral wall part on the side of the cylindrical opening of the metallic container to fix the closing member, and heating the cylindrical opening of the metallic container from outside to melt the seal member, thereby fusing the seal member to both the inner wall surface on the side of the cylindrical opening of the metallic container and the outer surface of the metallic closing member, and thereafter, solidifying the seal member.

The method for manufacturing the gas generator including the sealing structure of the second aspect differs from the method for manufacturing the gas generator including the sealing structure of the first aspect in a position where the closing member is attached because the container shapes in these methods are different from each other, but these methods can be performed in the same process.

Preferable embodiments of the method for manufacturing the gas generator including the sealing structure of the first aspect of the present invention and the method for manufacturing the gas generator including the sealing structure of the second aspect of the present invention are to use the closing member having the outer surface covered with the seal member.

The closing member having the outer surface covered with the seal member may be, for example, a closing member having an outer surface plated with metal, such as copper, and a closing member having an outer surface covered with thermoplastic resin. When such a closing member formed integrally with the seal member is used, it becomes easier to insert the inserting the closing member, with the seal member being interposed, and this is preferable.

The sealing structure of the sealed container according to an embodiment of the present invention can prevent moisture from entering from outside, whereby product reliability can be enhanced.

The sealing structure according to an embodiment of the present invention can be utilized as a sealed container for applications requiring moisture prevention in each technical field, and can be used particularly in a sealing structure including a housing in a gas generator of an airbag device mounted in an automobile.

Figure 2:
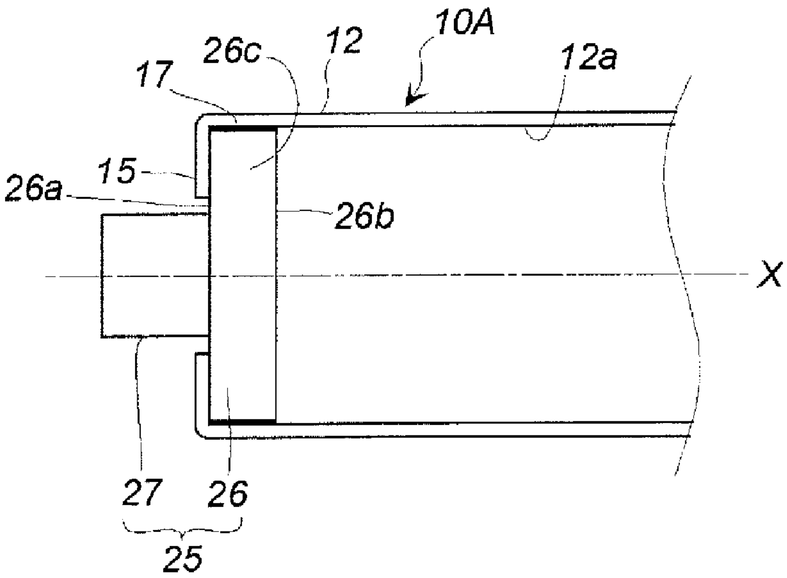
FIG. 2 illustrates a partial cross-sectional view in an embodiment different from that illustrated in FIG. 1.

(1) Sealed Container Including Sealing Structure Illustrated in FIGS. 1 and 2

A sealed container (a cylindrical container including a sealing structure) 10 illustrated in FIG. 1 has a sealing structure including a closing member 13, an annular deformed part 15, and a seal member 17.

The sealed container 10 includes a first end opening 11*a*, a second end opening (not illustrated) on an opposite side thereto in an axis X direction, and a peripheral wall part 12. The sealed container 10 includes, in a width direction, a circular cross-section and is made of iron.

The plate-like closing member 13 includes a first surface 13*a*, a second surface 13*b* on an opposite side of the first surface 13*a* in a thickness direction, and a circumferential surface part (an outer surface) 13*c* between the first surface 13*a* and the second surface 13*b*.

The plate-like closing member 13 is made of iron and has the circumferential surface part 13*c* plated with copper at a stage prior to assembling, and the copper plated portion serves as the seal member 17. Instead of plating, a method of applying a metal foil, a method of fitting an annular member made of metal, or the like may also be used.

The plate-like closing member 13 to be used may be a member in which the circumferential surface part 13*c* is covered with a thermoplastic resin. Examples of a method of covering the circumferential surface part 13*c* of the plate-like closing member 13 with a thermoplastic resin includes a method of applying a thermoplastic resin dissolved in a solvent and then drying the same, a method of applying a thermoplastic resin melted and then solidifying the same, a method of applying a thermoplastic resin adhesive and then drying the same, a method of fitting an annular member made of a thermoplastic resin, or the like.

A planar shape of the plate-like closing member 13 has the same circular shape as that of the first end opening 11*a* of the cylindrical container (a sealed container) 10 and has a size that can be inserted into the first end opening 11*a*.

Before the annular deformed part 15 is formed, the plate-like closing member 13 is inserted, by a distance corresponding to a thickness of the plate-like closing member 13, from the first end opening 11*a* into the inside of the sealed container 10, with the second surface 13*b* facing the inside, the first surface 13*a* facing the outside, and the circumferential surface part 13*c* facing an inner wall surface 12*a* of the sealed container 10.

The annular deformed part (a crimped portion) 15 is a part where the peripheral wall part 12 on the side of the first end opening 11*a* of the sealed container 10 is crimped inward, i.e., crimped to allow the annular deformed part 15 to abut against the first surface 13*a* of the closing member 13.

A gap between the circumferential surface part 13*c* of the plate-like closing member 13 and the inner wall surface 12*a* of the sealed container 10 is closed and sealed with melted and hardened copper (a seal member 17).

In the sealed container 10 illustrated in FIG. 1, the gap between the plate-like closing member 13 and the inner wall surface 12*a* of the sealed container 10 is sealed, thereby preventing moisture from entering from outside. Note that in the embodiment illustrated in FIG. 1, an O-ring is not illustrated, but an O-ring may be used or may not be used.

Next, a method for forming the sealing structure of the sealed container 10 illustrated in FIG. 1 will be described.

In a first step, the closing member 13 is inserted into the inside of the first end opening 11*a* of the sealed container 10, with the second surface 13*b* facing inward and the first surface 13*a* facing outward.

The circumferential surface part 13*c* having a copper plating layer serving as the seal member 17 and the inner wall surface 12*a* of the sealed container 10 are made to radially face each other. At this time, taking into account a length of forming the annular deformed part 15 in the next step (a length of folding in a crimping process), a position of inserting the closing member 13 is adjusted.

Note that for facilitating the insertion of the closing member 13, an outer diameter of the closing member 13 is adjusted to be slightly smaller than an inner diameter of the sealed container 10 at an insertion portion, whereby a slight gap is formed between the circumferential surface part 13*c* and the inner wall surface 12*a* of the sealed container 10.

In a second step, the peripheral wall part 12 on the side of the first end opening 11*a* of the sealed container 10 is crimped until the peripheral wall part 12 abuts against the first surface 13*a* of the closing member 13, thereby forming the annular deformed part 15.

In addition to a rolling crimping method using a rolling crimping tool described in JP 2017-39142 A, rolling crimping methods described in paragraphs 0037 and 0038 in JP 2007-223485 A and a paragraph 0035 in JP 2008-241186 A are also applicable.

In a third step, a position corresponding to the circumferential surface part 13*c* that has the copper plating layer and faces the inner wall surface 12*a* of the sealed container 10 is heated from outside to melt copper. Examples of the heating method include heating by laser welding and heating by electron beam welding. In a case where laser welding or electron beam welding is implemented where a bean is irradiated from outside the cylindrical member, the beam may have a strength at which, for instance, the seal member melts while the beam does not necessarily have to reach the closing member.

Due to heating, copper in a melted state is present in the gap between the circumferential surface part 13*c* of the closing member 13 and the inner wall surface 12*a* of the sealed container 10, and the copper in a melted body state diffuses across the gap between the circumferential surface part 13*c* and the inner wall surface 12*a* of the sealed container 10. Thereafter, by terminating the heating and leaving the container as it is, the copper in the melted state solidifies in a state of being fused to both the circumferential surface part 13*c* of the closing member 13 and the inner wall surface 12*a* of the sealed container 10, and then, the gap is closed and sealed.

A sealed container (a cylindrical container including a sealing structure) 10A shown in FIG. 2 has a sealing structure including a closing member 25, an annular deformed part 15, and a seal member 17.

The sealed container 10 is made of iron.

The closing member 25 is made of iron, and includes a base part 26 having a circular shape and a columnar part 27 provided perpendicularly to the base part 26, the base part 26 having a copper plating layer serving as the seal member 17 at a stage prior to assembling.

The base part 26 is inserted, by a distance corresponding to a thickness of the base part 26, from the first end opening 11*a* into the inside of the sealed container 10A, with a second surface 26*b* facing an inside of the sealed container 10A, a first surface 26*a* facing an outside, and a circumferential surface part (an outer surface) 26*c* abutting against the inner wall surface 12*a* of the sealed container 10A.

A gap between the circumferential surface part 26*c* of the base part 26 and the inner wall surface 12*a* of the sealed container 10 is sealed by being closed with the melted and hardened copper.

The annular deformed part (a crimped portion) 15 is a part where the peripheral wall part 12 on the side of the first end opening 11*a* of the sealed container 10A is crimped inward, i.e., crimped to abut against the first surface 26*a* of the base part 26 of the closing member 25.

The sealing structure of the sealed container 10A of FIG. 2 can be formed in the same manner as the sealed container 10 of FIG. 1.

Figure 3:
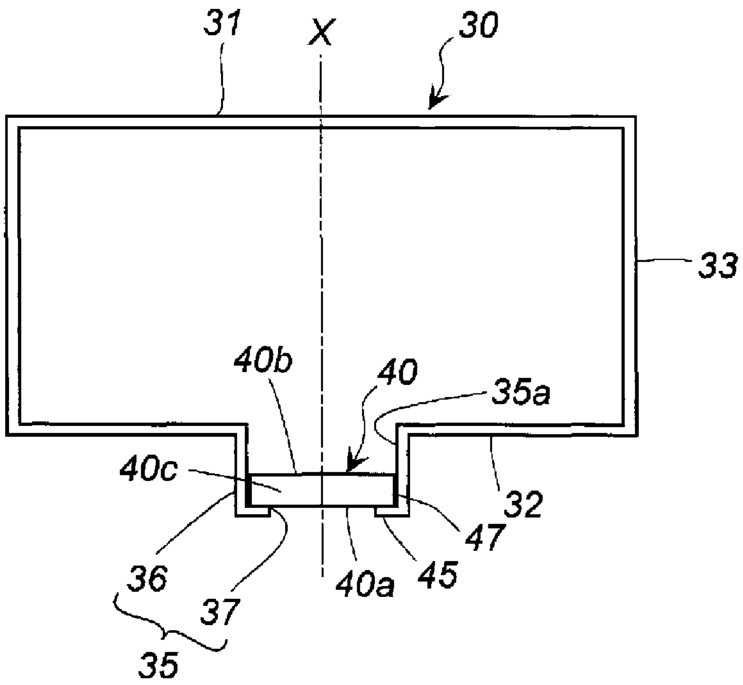
FIG. 3 illustrates a cross-sectional view in an embodiment different from that in each of FIGS. 1 and 2.
Figure 4:
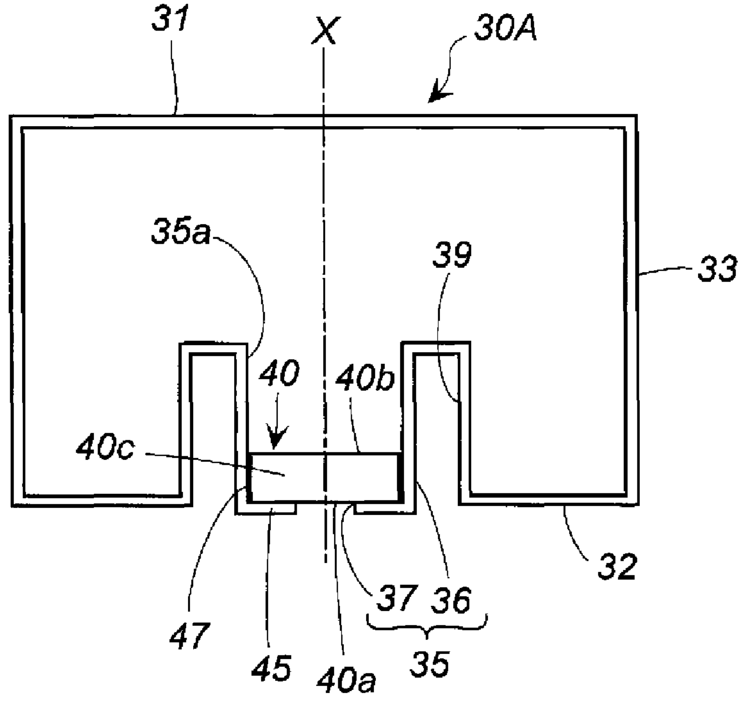
FIG. 4 illustrates a cross-sectional view in an embodiment different from that illustrated in each of FIGS. 1 to 3.

(2) Sealed Container Illustrated in FIG. 3 and FIG. 4

A sealed container 30 illustrated in FIG. 3 has a sealing structure including a closing member 40, an annular deformed part 45, and a seal member 47.

The sealed container 30 illustrated in FIG. 3 is made of iron, and includes a container body including a top plate 31, a bottom plate 32 on a side opposite the top plate 31 in an axis X direction, and a peripheral wall part 33 between the top plate 31 and the bottom plate 32, and a cylindrical opening 35 formed in a central portion of the bottom plate 32.

In the embodiment illustrated in FIG. 3, the container body and the cylindrical opening 35 are integrally formed, but an embodiment may be adopted in which the container body and the cylindrical opening 35 are formed as separate members, the cylindrical opening 35 as the separate member is inserted from a hole on the bottom plate 32 and arranged, and the contact portion is integrated by a fixing method using welding, press fitting, retainer, or the like.

The sealed container 30 may be also designed to be divided into two parts, a part of a top plate 31 side and a part of a bottom plate 32 side, for component arrangement inside the container, and in this case, the two parts are combined to be welded together into one form for use.

The cylindrical opening 35 includes a cylindrical wall part 36 and a tip opening 37.

The sealed container 30 has, on the top plate 31 side thereof and the bottom plate 32 side thereof, circular planar shapes, and is made of metal such as iron or stainless steel.

The plate-like closing member 40 includes a first surface 40*a*, a second surface 40*b* on a side opposite the first surface 40*a* in a thickness direction, and a circumferential surface part (an outer surface) 40*c* between the first surface 40*a* and the second surface 40*b*.

The plate-like closing member 40 is made of iron and has the circumferential surface part 40*c* plated with copper at a stage prior to assembling, and the copper plated portion serves as the seal member 47. Instead of plating, a method of applying a metal foil, a method of fitting an annular member made of metal, or the like may also be used.

The plate-like closing member 40 to be used may be a member in which the circumferential surface part 40*c* is covered with a thermoplastic resin.

Examples of the method of covering the circumferential surface part 40*c* of the plate-like closing member 40 with a thermoplastic resin includes a method of applying a thermoplastic resin dissolved in a solvent and then drying the same, a method of applying a thermoplastic resin melted and then solidifying the same, a method of applying a thermoplastic resin adhesive and then drying the same, a method of fitting an annular member made of a thermoplastic resin, or the like.

A planar shape of the plate-like closing member 40 is the same circular shape as that of the tip opening 37 of the cylindrical opening 35 and has a size that enables the insertion into the tip opening 37.

Before the annular deformed part 45 is formed, the plate-like closing member 40 is inserted, by a distance corresponding a thickness of the plate-like closing member 40, from the tip opening 37 into an inside of the sealed container 30, with the second surface 40*b* facing the inside, the first surface 40*a* facing the outside, and the circumferential surface part 40*c* abutting against an inner wall surface 35*a* of the cylindrical wall part 36.

The annular deformed part (a crimped portion) 45 is a part where the cylindrical wall part 36 on the tip opening 37 side of the cylindrical opening 35 is crimped inward, i.e., crimped, whereby the annular deformed part 45 abuts against the first surface 40*a* of the closing member 40.

A gap between the circumferential surface part 40*c* of the plate-like closing member 40 and the inner wall surface 35*a* of the sealed container 30 is closed and sealed with melted and hardened copper (a seal member 47).

In the sealed container 30 illustrated in FIG. 3, the gap between the plate-like closing member 40 and the inner wall surface 35*a* of the cylindrical opening 35 is sealed, thereby preventing moisture from entering from outside. Note that in the embodiment illustrated in FIG. 3, an O-ring is not illustrated, but an O-ring may be used or may not be used.

Next, a method for forming a sealing structure of the sealed container 30 illustrated in FIG. 3 will be described.

In a first step, the closing member 40 is inserted into the inside of the tip opening 37 of the cylindrical opening 35 protruding from the bottom plate 32 of the sealed container 30, with the second surface 40*b* facing inward the sealed container 30 and the first surface 40*a* facing outward. The closing member 40*c* has the circumferential surface part 40*c* plated with copper.

At this time, taking into account a length of forming the annular deformed part 45 in the next step, a position of inserting the closing member 40 is adjusted.

In a second step, the cylindrical wall part 36 on the tip opening 37 side of the cylindrical opening 35 is crimped until the cylindrical wall part 36 abuts against the first surface 40*a* of the closing member 40, thereby forming the annular deformed part 45.

As the crimping method, a rolling crimping method similar to that described above is applicable.

In a third step, a portion of the cylindrical wall part 36 that corresponds to the circumferential surface part 40*c* of the closing member 40 and faces the inner wall surface 35*a* of the cylindrical opening 35 is heated from outside, thereby melting the copper plating of the circumferential surface part 40*c*.

By leaving the container as it is after terminating the heating, the melted copper solidifies and the seal member 47 is formed, and then, the gap between the circumferential surface part 40*c* of the closing member 40 and the inner wall surface 35*a* of the cylindrical opening 35 is closed and sealed with the seal member 47.

Examples of the heating method include heating by laser welding and heating by electron beam welding as described for FIG. 1.

A sealed container 30A illustrated in FIG. 4 is the same as the sealed container 30 in FIG. 3, except that a position where the cylindrical opening is formed, in the sealed container 30A is different from that in FIG. 3.

Because the cylindrical opening 35 is formed in a recess 39 formed in the bottom plate 32, the cylindrical opening 35 does not have a structure protruding from the bottom plate 32 unlike the sealed container 30 illustrated in FIG. 3.

However, in the case of FIG. 4, the cylindrical wall part 36 does not protrude from the bottom plate 32, hence it becomes difficult to implement welding (welding beam irradiation) to melt the seal member 47. In this case, the copper plating may also be performed on the first surface 40*a* of the closing member 40, whereby a welding beam can be applied to the annular deformed part 45 or a boundary portion between the annular deformed part 45 and the cylindrical wall part 36.

Figure 5:
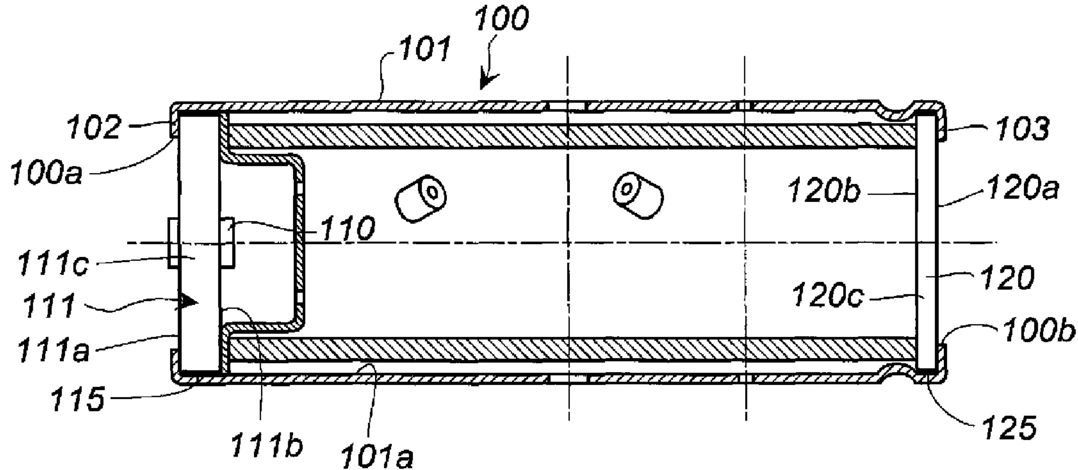
FIG. 5 is an axial cross-sectional view illustrating an embodiment of a gas generator including the sealing structure according to an embodiment of the present invention.

(3) Gas Generator Illustrated in FIG. 5

A gas generator 100 illustrated in FIG. 5 is the same as the gas generator 10 disclosed in FIG. 1 of JP 2011-225069 A, except that the gas generator 100 has the sealing structure according to an embodiment of the present invention.

The gas generator 100 illustrated in FIG. 5 has the sealing structure according to an embodiment of the present invention, which is adopted both end openings of a cylindrical housing 101.

An igniter 110 including an igniter collar 111 is disposed on a first end opening 100*a*.

The igniter collar 111 includes a second surface 111*b* facing inward, a first surface 111*a* facing outward, and a circumferential surface part (an outer surface) 111*c* abutting against an inner wall surface 101*a* of the cylindrical housing 101. The circumferential surface part 111*c* of the igniter collar 111 is plated with copper at a stage prior to assembling.

The cylindrical housing 101 on the first end opening 100*a* side is crimped inward to form a first annular deformed part 102.

A gap between the circumferential surface part 111*c* of the igniter collar 111 and the inner wall surface 101*a* of the cylindrical housing 101 is closed and sealed with a seal member 115 on the circumferential surface part 111*c* of the igniter collar 111, with the seal member 115 being the copper plating that has melted and hardened.

A plate-like closing member (a closing part) 120 is disposed on a second end opening 100*b* side on a side opposite the first end opening 100*a* in an axial direction.

The closing member 120 includes a second surface 120*b* facing inward, a first surface 120*a* facing outward, and a circumferential surface part (an outer surface) 120*c* abutting against the inner wall surface 101*a* of the cylindrical housing 101. The circumferential surface part 120*c* of the closing member 120 is plated with copper at a stage prior to assembling.

The cylindrical housing 101 on the second end opening 100*b* side is crimped inward whereby a second annular deformed part 103 is formed.

A gap between the circumferential surface part 120*c* of the closing member 120 and the inner wall surface 101*a* of the cylindrical housing 101 is closed and sealed with a seal member 125 on the circumferential surface part 120*c* of the closing member 120, with the seal member 125 being the copper plating that has melted and hardened.

Next, a method for manufacturing the gas generator 100 illustrated in FIG. 5 will be described.

In a first step, the metallic plate-like closing member 120 is inserted into an inside of the second end opening 100*b* of the cylindrical housing 101 in which the gas discharge port is formed, with the second surface 120*b* facing inward, the first surface 120*a* facing outward, and the circumferential surface part 120*c* abutting against the inner wall surface 101*a* of the cylindrical housing. The circumferential surface part 120*c* of the metallic plate-like closing member 120 is plated with copper.

In a second step, the peripheral wall part on the second end opening 100*b* side of the cylindrical housing 101 is crimped until the peripheral wall part abuts against the first surface 120*a* of the closing member 120, thereby forming the second annular deformed part 103.

At this time, taking into account a length of forming the second annular deformed part 103 in the crimping step (a length of folding in the crimping process), a position of inserting the closing member 120 is adjusted.

As the crimping method, a rolling crimping method similar to that described above can be applied.

In a third step, a gas generating agent, an igniter, a cylindrical filter, and a retainer are housed and arranged in the cylindrical housing 101 from the first end opening 100*a*.

In a fourth step, the igniter 110 including the metallic igniter collar 111 is inserted to be at the inside of the first end opening 100*a* of the cylindrical housing 101, with the second surface 111*b* facing inward, the first surface 111*a* facing outward, and the circumferential surface part 111*c* abutting against the inner wall surface 101*a* of the cylindrical housing.

At this time, taking into account a length of forming the first annular deformed part 102 in the crimping step, a position of inserting the igniter 110 (the igniter collar 111) is adjusted. The circumferential surface part 111*c* of the metallic igniter collar 111 is plated with copper.

In a fifth step, the peripheral wall part on the first end opening 100*a* side of the cylindrical housing 101 is crimped until the peripheral wall part abuts against the first surface 111*a* of the igniter collar 111, thereby forming the first annular deformed part 102.

In a sixth step, a portion of the cylindrical housing 101 that corresponds to the circumferential surface part 120*c* of the metal plate-like closing member 120 and faces the inner wall surface 101*a* of the cylindrical housing is heated from outside, thereby melting the copper plating of the circumferential surface part 111*c*.

In parallel, a portion that corresponds to the circumferential surface part 111*c* of the metallic igniter collar 111 and faces the inner wall surface 101*a* of the cylindrical housing is heated from outside, thereby melting the copper plating of the circumferential surface part 120*c*.

By leaving the container as it is after terminating the heating, the melted copper solidifies, and the seal member 115 and the seal member 125 are formed. Therefore, the gap between the circumferential surface part 120*c* of the metallic plate-like closing member 120 and the inner wall surface 101*a* of the cylindrical housing is closed and sealed with the seal member 115, whereby the gap between the circumferential surface part 111*c* of the metallic igniter collar 111 and the inner wall surface 101*a* of the cylindrical housing is closed and sealed with the seal member 125.

Examples of the heating method include heating by laser welding and heating by electron beam welding as described for FIG. 1.

Note that the cylindrical housing 101 used in the first step may be a housing having a gas discharge port formed in advance on the peripheral wall part, a housing having the second end opening 100*b*, to which a component having a gas discharge port (a cup-shaped diffuser portion) is fixed, of the cylindrical housing 101 by welding or the like, or a housing having the second end opening 100*b* formed integrally with the cylindrical housing 101 by a deep drawing method. The cup-shaped diffuser portion includes a gas discharge port formed in one or both of a peripheral wall part and a bottom face part of a metallic cup.

In the first step, in a case of using the housing having the second end opening 100*b*, to which the cup-shaped diffuser portion is fixed, or in a case of forming the second end opening 100*b* integrally with the cylindrical housing 101, the first step and the second step are omitted.

Figure 6:
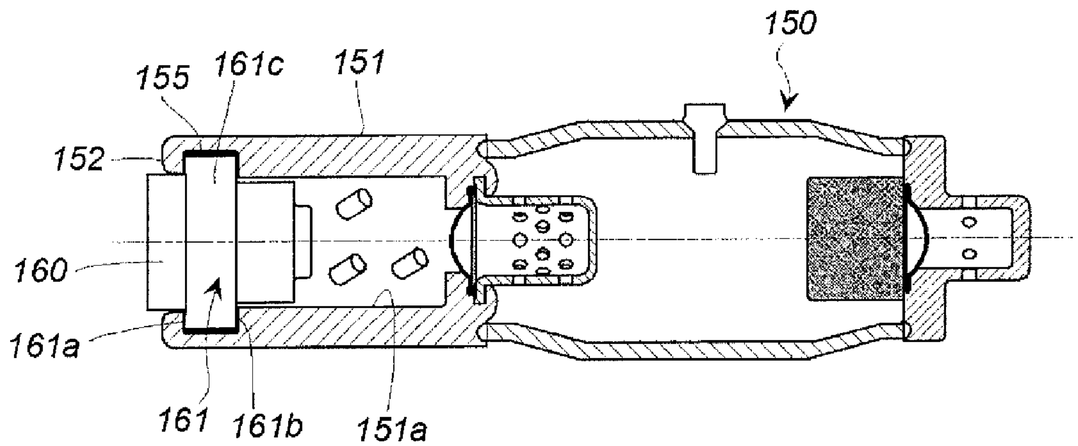
FIG. 6 is an axial cross-sectional view illustrating another embodiment of the gas generator including the sealing structure according to an embodiment of the present invention.

(4) Gas Generator Illustrated in FIG. 6

A gas generator 150 illustrated in FIG. 6 is the same as the gas generator 10 disclosed in FIG. 1 of JP 2014-184427 A, except that gas generator 150 has the sealing structure according to an embodiment of the present invention.

The gas generator 150 illustrated in FIG. 6 has the sealing structure according to an embodiment of the present invention, which is adopted in an opening on one end side of a first cylindrical housing 151.

An igniter including an igniter collar 160 is disposed at an opening on a first end side.

The igniter collar 160 includes an annular protrusion 161 that serves as a closing part protruding radially outward. The annular protrusion 161 includes a second surface 161*b* facing the inside of the first cylindrical housing 151, a first surface 161*a* facing the outside, and a circumferential surface part (an outer surface) 161*c* abutting against an inner wall surface 151*a* of the first cylindrical housing 151. The circumferential surface part 161*c* of the igniter collar 160 is plated with copper at a stage prior to assembling. The first cylindrical housing 151 on the first end opening side is crimped inward, thereby forming an annular deformed part 152.

A gap between the circumferential surface part 161*c* of the igniter collar 160 and the inner wall surface 151*a* of the first cylindrical housing 151 is closed and sealed with a seal member 155 on the circumferential surface part 161*c* of the igniter collar 160, with the seal member 155 being the copper plating that has melted and hardened.

Figure 7:
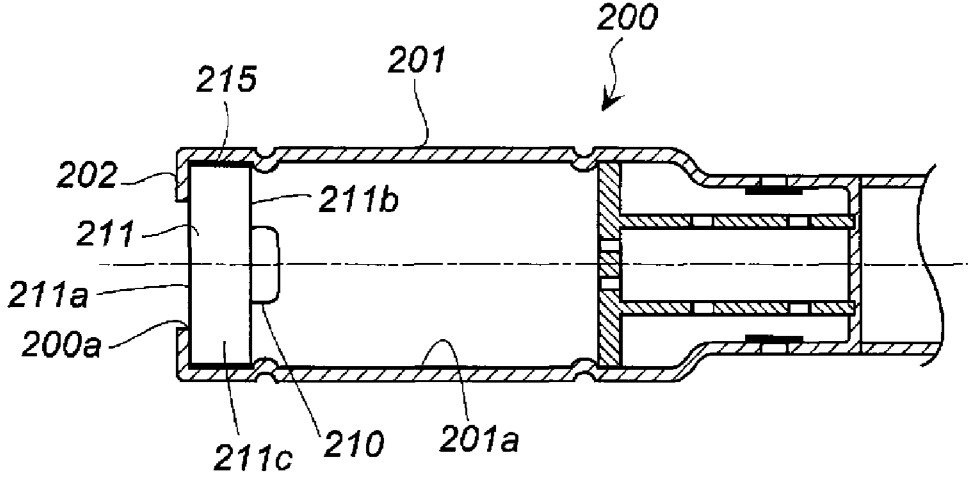
FIG. 7 is a partial cross-sectional view in an axial direction illustrating still another embodiment of the gas generator including the sealing structure according to an embodiment of the present invention.

(5) Gas Generator Illustrated in FIG. 7

A gas generator 200 illustrated in FIG. 7 is the same as the gas generator 10 disclosed in FIG. 1 of JP 2014-94614 A, in which, as a gas generation source, a gas generating agent and a pressurized gas are used in combination, except that the gas generator 200 has the sealing structure according to an embodiment of the present invention.

The gas generator 200 illustrated in FIG. 7 has the sealing structure according to an embodiment of the present invention, which is adopted in an opening on one end side of a first cylindrical housing 201.

An igniter 210 including an igniter collar 211 is disposed at a first end opening 200*a* side.

The igniter collar 211 includes a second surface 211*b* facing the inside of the first cylindrical housing 201, a first surface 211*a* facing the outside, and a circumferential surface part (an outer surface) 211*c* abutting against an inner wall surface 201*a* of the first cylindrical housing 201. The circumferential surface part 211*c* of the igniter collar 211 is plated with copper at a stage prior to assembling.

The first cylindrical housing 201 on the first end opening 200*a* side is crimped inward thereby forming an annular deformed part 202.

A gap between the circumferential surface part 211*c* of the igniter collar 211 and the inner wall surface 201*a* of the first cylindrical housing 201 is closed and sealed with a seal member 215 on the circumferential surface part 211*c* of the igniter collar 211, with the seal member 215 being the copper plating that has melted and hardened.

Figure 8:
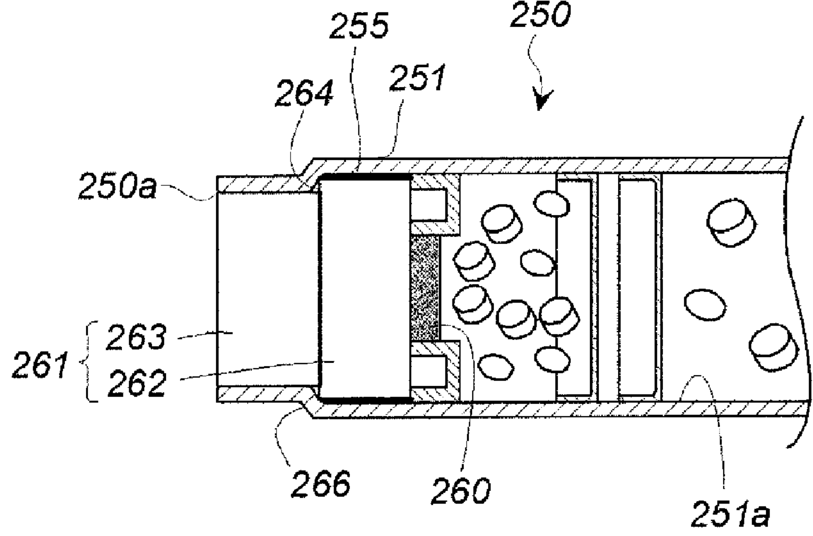
FIG. 8 is a partial cross-sectional view in an axial direction illustrating yet another embodiment of the gas generator including the sealing structure according to an embodiment of the present invention.

(6) Gas Generator Illustrated in FIG. 8

A gas generator 250 illustrated in FIG. 8 is the same as the gas generator 10 disclosed in FIG. 1 of JP 2015-74413 A, except that the gas generator 250 has the sealing structure according to an embodiment of the present invention.

The gas generator 250 illustrated in FIG. 8 has the sealing structure according to an embodiment of the present invention, which is adopted in an opening on one end side of a cylindrical housing 251.

An igniter 260 including an igniter collar 261 is disposed on a first end opening 250*a* side.

The igniter collar 261 includes a large diameter portion 262 on the igniter 260 side and a small diameter portion 263 adjacent to the large diameter portion 262, and includes an annular stepped-surface 264 created by a difference between an outer diameter of the large diameter portion 262 and an outer diameter of the small diameter portion 263 (outer diameter of the larger diameter portion 262>outer diameter of the small diameter portion 263). The outer surface of the large diameter portion 262 of the igniter collar 261 is plated with copper at a stage prior to assembling.

An abutting surface between the outer peripheral surface of the large diameter portion 262 and an inner wall surface 251*a* of the cylindrical housing is a first abutting surface. A gap is formed between the outer peripheral surface of the small diameter portion 263 and the inner wall surface 251*a*. The cylindrical housing 251 is fabricated to be reduced in diameter from the large diameter portion 262 to the small diameter portion 263, and thus, has an annular step-inclined portion (an annular deformed part) 266 formed due to a difference between an outer diameter of the first abutting surface and an outer diameter of the portion reduced in diameter.

A gap is formed between the outer surface of the small diameter portion 263 of the igniter collar 261 and the inner wall surface 251*a* of the cylindrical housing 251. In addition, a gap between the large diameter portion 262 and the inner wall surface 251*a* is closed and sealed with a seal member 255 on the outer surface of the large diameter portion 262 of the igniter collar 261, with the seal member 255 being the copper plating that has melted and hardened. Note that the plating may reach the annular stepped-surface 264 of the igniter collar 261, and the plating may be melted to implement sealing between the annular stepped-surface 264 and the annular deformed part 266.

Figure 9:
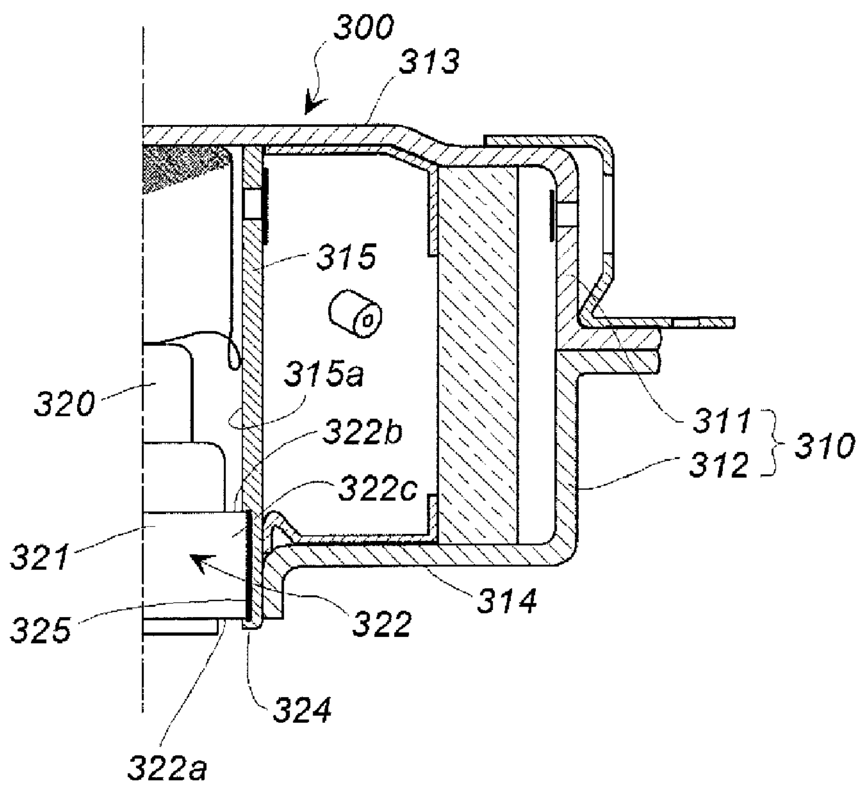
FIG. 9 is an axial cross-sectional view illustrating yet another embodiment of the gas generator including the sealing structure according to an embodiment of the present invention.

(7) Gas Generator Illustrated in FIG. 9

A gas generator 300 illustrated in FIG. 9 is the same as the gas generator 1 disclosed in FIG. 2 in JP 2012-140028 A (partial cross-sectional view in FIG. 1), except that the gas generator 300 has the sealing structure according to an embodiment of the present invention.

The gas generator 300 illustrated in FIG. 9 has the sealing structure according to an embodiment of the present invention, which is adopted on a bottom plate 314 side of a housing 310 including a diffuser shell 311 and a closure shell 312.

An inner cylindrical member 315 is disposed in a hole at a central portion of the bottom plate 314, and an igniter 320 including an igniter collar 321 is disposed on the inside of the inner cylindrical member 315.

The inner cylindrical member 315 is fixed, on a first end opening side thereof, to a top plate 313 and closed, and protrudes, on a second end opening side thereof opposite to the first end opening, slightly outward from the bottom plate 314. In the present embodiment, the inner cylindrical member 315 serves as the cylindrical opening 35 in the embodiment illustrated in FIGS. 3 and 4.

The igniter collar 321 includes an annular protrusion 322 protruding radially outwardly, similarly to the igniter collar 160 illustrated in FIG. 6.

The annular protrusion 322 has a second surface 322*b* facing the inside of the inner cylindrical member 315, a first surface 322*a* facing the outside, and a circumferential surface part (an outer surface) 322*c* between the first surface 322*a* and the second surface 322*b*, and the circumferential surface part 322*c* is fitted into an annular stepped-surface formed in the inner cylindrical member 315. The circumferential surface part 322*c* of the igniter collar 321 is plated with copper at a stage prior to assembling.

The inner cylindrical member 315 on the opening side protruding outward is crimped inward thereby forming an annular deformed part 324, and the annular deformed part 324 abuts against the first surface 322*a* of the annular protrusion 322.

A gap between the circumferential surface part 322*c* of the igniter collar 321 and the inner wall surface 315*a* of inner cylindrical member 315 is closed and sealed with a seal member 325 on the circumferential surface part 322*c* of the igniter collar 321, with the seal member 325 being the copper plating that has melted and hardened.

Next, a method for manufacturing the gas generator 300 illustrated in FIG. 9 will be described.

In a first step, necessary components such as a gas generating agent, a flame-transferring agent, a cylindrical filter, an inner cylindrical member, and a retainer are housed and arranged in the housing 310, in which the diffuser shell 311, to which the inner cylindrical member 315 is fixed, and the closure shell 312 are provided separately from each other.

After that, the diffuser shell 311 and the closure shell 312 are combined to form the housing 310, and a contact portion therebetween is then welded.

In a second step, the igniter 320 having a flame-transferring agent and the igniter collar 321 is inserted from the second end opening of the inner cylindrical member 315. At this time, the igniter 320 is inserted, with the second surface 322*b* of the annular protrusion 322 of the igniter collar 321 facing inward and abutting against a stepped-surface of the inner cylindrical member 315, the first surface 322*a* facing outward, and the circumferential surface part 322*c* abutting against an inner wall surface of the inner cylindrical member 315.

In a third step, the peripheral wall part of the second end opening of the inner cylindrical member 315 is crimped inward until the peripheral wall part abuts against the first surface 322*a* of the annular protrusion 322 of the igniter collar 321, thereby forming the annular deformed part 324.

As the crimping method, a rolling crimping method similar to that described above can be applied.

In a fourth step, a portion of the inner cylindrical member 315 that corresponds to the circumferential surface part 322*c* of the annular protrusion 322 of the igniter collar 321 and faces the inner wall surface 315*a* of the inner cylindrical member 315 is heated from outside thereby melting the copper plating of the circumferential surface part 322*c*.

By leaving the generator as it is after terminating the heating, the melted copper solidifies and the seal member 325 is formed, and then, the gap between the circumferential surface part 322*c* of the annular protrusion 322 of the igniter collar 321 and the inner wall surface 315*a* of the inner cylindrical member 315 is closed and sealed with the seal member 325.

Examples of the heating method include heating by laser welding and heating by electron beam welding.

The present invention has been described as above. Of course, the present invention includes various forms of modifications within the scope thereof, and these modifications do not depart from the scope of the invention. All of what a person with ordinary skill in the art will clearly consider as a variation of the present invention is within the scope of the claims set forth below.

The invention claimed is:

1. A sealing structure of a sealed container, comprising:

a metallic cylindrical container having an opening; and a metallic closing member that closes the opening, the metallic closing member having a first surface facing outside of the sealed container, a second surface facing inside of the sealed container, and an outer circumferential surface extending between the first surface and the second surface, the outer circumferential surface of the metallic closing member opposing an inner wall surface of the metallic cylindrical container, the outer circumferential surface and the first surface of the metallic closing member being one of plated with metal and covered with thermoplastic resin, wherein the metallic closing member seals the opening of the metallic cylindrical container by one of melted metal and melted thermoplastic resin provided between the outer circumferential surface of the metallic closing member and the inner wall surface of the metallic cylindrical container, and between the first surface of the metallic closing member and an annular deformed part of the metallic cylindrical container formed by deforming one end of the metallic cylindrical container to face the first surface, and wherein the one of melted metal and melted thermoplastic resin is a material different from a material of the metallic cylindrical container and the metallic closing member.

2. The sealing structure according to claim 1, wherein the sealing structure is for an airbag gas generator.

3. The sealing structure according to claim 1, wherein the metallic cylindrical container is made of iron.

4. The sealing structure according to claim 1, wherein the metallic closing member is made of iron.

5. The sealing structure according to claim 1, wherein the melted metal is copper plated on the outer circumferential surface of the metallic closing member and on the first surface of the metallic closing member.

* * * * *